United States Patent
Cheng et al.

(10) Patent No.: US 7,331,008 B2
(45) Date of Patent: Feb. 12, 2008

(54) ERASURE DECODING OPTIMIZATION OF ACKNOWLEDGMENT/NEGATIVE ACKNOWLEDGMENT INFORMATION IN A WIRELESS COMMUNICATION SYSTEM

(75) Inventors: Fang-Chen Cheng, Randolph, NJ (US); Teck Hu, Budd Lake, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 579 days.

(21) Appl. No.: 10/644,864

(22) Filed: Aug. 21, 2003

(65) Prior Publication Data
US 2005/0042985 A1   Feb. 24, 2005

(51) Int. Cl.
*G08C 25/02* (2006.01)
*H04L 1/18* (2006.01)

(52) U.S. Cl. ..................................... 714/748
(58) Field of Classification Search ........... 714/748, 714/749, 751, 774, 750, 752; 370/242
See application file for complete search history.

(56) References Cited

U.S. PATENT DOCUMENTS

| | | | |
|---|---|---|---|
| 6,438,723 B1 * | 8/2002 | Kalliojarvi | 714/751 |
| 6,496,481 B1 * | 12/2002 | Wu et al. | 370/242 |
| 6,615,382 B1 * | 9/2003 | Kang et al. | 714/748 |
| 6,640,325 B1 * | 10/2003 | Fischer | 714/748 |
| 6,977,888 B1 * | 12/2005 | Frenger et al. | 370/218 |
| 6,999,432 B2 * | 2/2006 | Zhang et al. | 370/328 |
| 2003/0100268 A1 * | 5/2003 | Moulsley et al. | 455/69 |
| 2003/0210668 A1 * | 11/2003 | Malladi et al. | 370/335 |
| 2004/0095907 A1 * | 5/2004 | Agee et al. | 370/334 |

FOREIGN PATENT DOCUMENTS

| | | |
|---|---|---|
| EP | 1 326 361 A | 7/2003 |
| WO | WO 03/043218 A | 5/2003 |

OTHER PUBLICATIONS

Foreign Search Report dated Dec. 14, 2004.

* cited by examiner

*Primary Examiner*—Guy Lamarre
*Assistant Examiner*—Fritz Alphonse

(57) ABSTRACT

In the method of erasure decoding of acknowledgement (ACK)/negative acknowledgement (NACK) feedback information, a state of received ACK/NACK feedback information for associated sent data is detected based on at least one threshold derived using an objective function. The objective function includes at least a first term representing an affect on data throughput for at least one possible type of error in detecting a state of the received ACK/NACK feedback information.

16 Claims, 2 Drawing Sheets

ERASURE DECODING OPTIMIZATION OF ACKNOWLEDGMENT/NEGATIVE ACKNOWLEDGMENT INFORMATION IN A WIRELESS COMMUNICATION SYSTEM

BACKGROUND OF THE INVENTION

The Ack/Nack (acknowledgment/negative acknowledgement) fields in the R-ACKCH (reverse link acknowledgement channel) in CDMA2001x EV-DV or UL HS-DPCCH (up link high speed—dedicated physical control channel) in UMTS are error controlled independently by repetition block code. In CDMA2001x EV-DV, the R-ACKCH contains 1-bit Ack/Nack per 1.25 ms PCG (power control group) with symbol repetition of 24 times. In UMTS, the acknowledgement bit is repetition coded to 10 bits and transmits in one slot. An Ack sent in response to a received transmission indicates the transmission was properly received. A Nack in response to a transmission indicates the transmission was not properly received. In response to an Ack, the transmitter transmits the next data for transmission. In response to a Nack, however, the transmitter retransmits the Nacked transmission or other redundancy version depending on the HARQ protocol type. The Ack/Nack fields in EV-DV and HSDPA are both DTX (i.e., transmitter power set at zero) when no Ack/Nack data is transmitted. Since the R-ACKCH and HS-PDCCH field are not error free, it is important to evaluate the reliability of each received Ack/Nack information.

To improve reliability, a three-state decoding mechanism is included in the rake receiver design of channel elements to support EV-DV and HSDPA (high speed data packet access) for UMTS. The three state decoding mechanism adds a new state of erasure to erase any unreliable feedback information. The unreliable feedback information is caused by information corruption through unreliable radio channel or no Ack/Nack being sent because of the missed detection of the DL (down link) high speed data. Currently, two thresholds are set to define whether feedback information qualifies as an Ack, a Nack, or an erasure. When the power level of the received feedback information falls below the first threshold, the feedback information is judged to be an Ack. When the feedback information is greater than a second threshold, which is greater than the first threshold, the feedback information is judged to be a Nack. And, when the power of the feedback information falls between the first and second thresholds, inclusive, the feedback information undergoes erasure. Erasure results in considering the erased feedback information as a Nack.

The merit of the three-state decoding strategy is to erase any unreliable feedback information to minimize throughput damaging errors. For example, when a Nack is decoded as an Ack, the receiver losses data, and must make a separate request for retransmission. And, if an Ack is considered a Nack, then needless retransmission of data takes place. Both of these errors will impact the system throughput. The three-state decoding strategy is to erase any unreliable feedback information rather than to pass it to the HARQ protocol. This particularly helps mitigate against the more damaging throughput error of considering a Nack as an Ack. However, the erasure of the feedback information has the setback of loosing the desired feedback information, and the consequence of the Ack/Nack erasure is the re-transmission of the downlink high-speed data information at the HARQ. Thus, it is important to determine how to properly erase the feedback information. As will be appreciated, this involves properly determining the thresholds for the Ack/Nack.

SUMMARY OF THE INVENTION

The present invention provides a method of erasure decoding of acknowledgement (ACK)/negative acknowledgement (NACK) feedback information.

In one exemplary embodiment of the method, the erasure decoding thresholds, which are used to detect Ack, Nack or erasure, have been optimized for throughput performance. In an exemplary embodiment, at least one threshold is derived based on the affect on data throughput for at least one possible type of error in detecting a state of the received ACK/NACK feedback information. For example, one possible type of error is missed detection of a NACK. In this example, the affect is represented as a cost of an average number of total bits to be retransmitted if a NACK is missed in detection. In another exemplary embodiment, the at least one threshold is derived based on the effect on data throughput if the state of the received ACK/NACK feedback information is correctly detected.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EMBODIMENTS

A Universal Mobile Telecommunications System (UMTS) typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Although the following description of the present invention is based on the UMTS network, it should be noted that the exemplary embodiments shown and described herein are meant to be illustrative only and not limiting in any way. For example, the present invention is equally applicable to CDMA2001x EV-DV. As such, various modifications will be apparent to those skilled in the art.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile, mobile station and remote station are synonymous and describe a remote user of wireless resources in a wireless communication network.

Analysis of the Reliability Matrix for the Ack/Nack Field

As discussed in the Background, H-ARQ requires the Ack/Nack feedbacks from a UE to determine the necessity of retransmission (H-ARQ has normal error control operation to compensate the frame error caused by fading channel if the Ack/Nack feedbacks are error free). The average data throughput (D) of the H-ARQ function at any specific frame per user considered by the Node B is as follows, $$D = \frac{N_{Total}}{K} P_{Ack,K} \prod_{j=1}^{K-1} (P_{Nack,j} + P_{Erasure,j}) \quad (1)$$

where $N_{Total}$ is the number of information bits for the given packet in a H-ARQ operation, K is the total number of transmissions for a successful H-ARQ operation, $P_{Nackj}$ is the probability of a negative acknowledgement (Nack) for a j-th transmission decoded by the BTS for retransmission, $P_{Ack,K}$ is the probability of an acknowledgement (Ack) decoded by the BTS and consideration of a successful HARQ operation at the k-th transmisssion, and $P_{Erasurej}$ is the probability of an erasure of a j-th transmission decided by the BTS when the received Ack/Nack field is considered unreliable. Accordingly, a retransmission could be caused by reception of a negative acknowledgement or feedback information erasure. The frame error detected by the UE would be the same as that transmitted from the BTS if no error is detected in the Ack/Nack report. The illustration of the three state binary erasure channel transition trellis is shown in FIG. 1.

Figure 1:
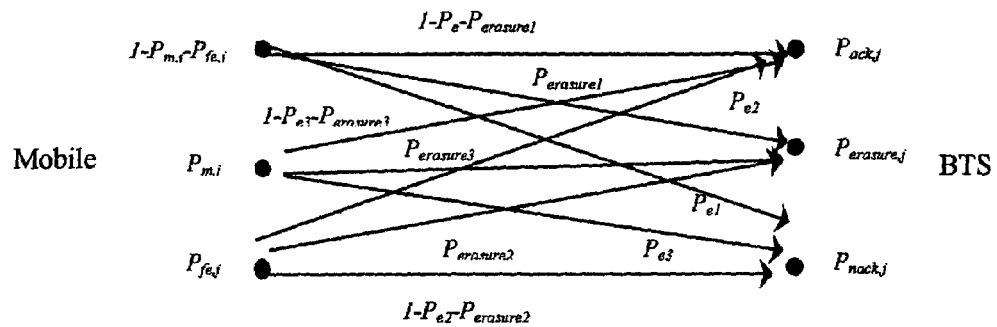
FIG. 1 illustrates the three state binary erasure channel transition trellis.

In FIG. 1, $P_{fej}$ is the probability of the DL PDCH/HS-PDSCH (down link packet data channel/high speed—packet data shared channel) frame error at j-th transmission, and $P_{mj}$ is the probability of the missed detection of the DL PDCCH/HS-SCCH (down link packet data control channel/high speed shared control channel). The HARQ protocol at the mobile generates the negative acknowledgement, acknowledgement, and nothing (null) based on the CRC check results of received DL PDCH/HS-PDSCH or no reception with probabilities $P_{fej}$, $1-P_{fej}-P_{mj}$ and $P_{mj}$, respectively, at a j-th transmission of a specific packet. $P_{e1}$, $P_{e2}$, and $P_{e3}$ are defined as the transition probabilities from the transmitted information at the mobile (s) to the received information at the BTS (r) in the following, $P_{e1} = P(r = Nack|s = Ack)$ $P_{e2} = P(r = Ack|s = Nack)$ $P_{e3} = P(r = Nack|s = Null) \quad (2)$ $P_{erasure1}$, $P_{erasure2}$, and $P_{erasure3}$ are the transition probabilities of the erasure at the receiver when the mobile sends the acknowledgement, negative acknowledgement, or nothing, respectively. $P_{Nackj}$, $P_{Ackj}$, and $P_{erasurej}$ are the probabilities of negative acknowledgement, acknowledgement, and erasure decoding output at the BTS receiver for the j-th transmission, respectively. The probabilities of the negative acknowledgement, acknowledgement, and erasure at the BTS may be formulated as the following:

$P_{Nackj} = P_{fej}(1-P_{e2}-P_{erasure2}) + (1-P_{fej}-P_{mj})P_{e1} + P_{m,j}P_{e3} \quad (3)$ $P_{Ackj} = (1-P_{fej}-P_{mj})(1-P_{e1}-P_{erasure1}) + P_{fej}P_{e2} + P_{mj}(1-P_{e3}-P_{erasure3}) \quad (4)$ $P_{erasurej} = P_{fej}P_{erasure2} + P_{mj}P_{erasure3} + (1-P_{fej}-P_{mj})P_{erasure1} \quad (5)$

Risk Function for the Ack/Nack Detection

The definition of throughput for a HARQ operation in equation (1) does not capture the penalty of the missed detection of a negative acknowledgment. As discussed in the Background, the purpose of erasure decoding is to minimize the probability of this missed detection and to minimize the detection error caused by the probability of no Ack/Nack being sent. If the probability of the erasure is high, based on the set thresholds, the probability of error in the Ack/Nack field is small. Since an erased Ack/Nack bit has the result of retransmission, the high erasure probability also has a high cost in terms of throughput. Thus, this cost needs to be incorporated in the data throughput analysis. To accomplish this, an objective function, referred to herein as a risk function, of a HARQ operation that accounts for the effects of missed detection of a negative acknowledgement is provided as follows, $$R = C_f N_f P_{missed=detection} - C_c D \quad (6)$$

where $C_f$ is the throughput cost of falsely detecting a Nack as an Ack, $(-C_c)$ is the throughput cost of correctly detecting an Ack, $N_f$ is the number of bits of the missed detected packet, and $P_{missed=detection}$ is the probability of the missed detection, which equals $P_{fe,K}$ times $P_{e2}$. The first term of the risk function is the cost of the average number of total bits to be retransmitted when the negative acknowledgement is missed in detection. The $2^{nd}$ term of the risk function is the added value (negative risk) of the data throughput when an acknowledgement is correctly detected in the feedback information. The Risk function in equation (6) is defined as the difference between the cost of the missed detection of a negative acknowledgement to trigger retransmission and the negative cost of the average data throughput. Substituting equation (1) into the risk function results in the following:

$$R = C_f N_f P_{fe,K} P_{e2} - \frac{C_c N_{Total} P_{Ack,K}}{K} \prod_{j=1}^{K-1} (P_{Nack,j} + P_{Erasure,j}) \quad (7)$$

Statistical Modelling of Ack/Nack Detection

Figure 2:
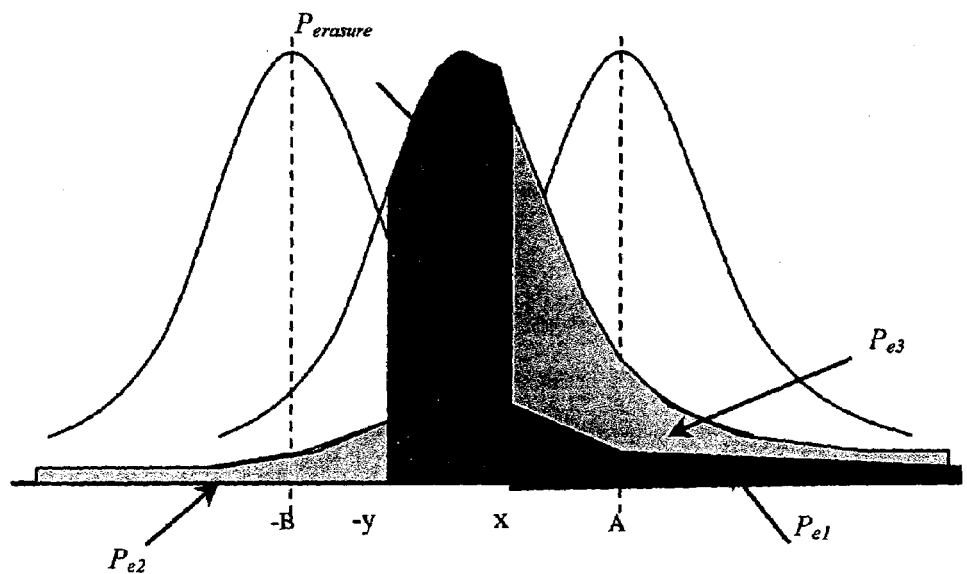
FIG. 2 illustrates he testing hypothesis of the received signal detection through AWGN (a white Gaussian noise) channel $N(0, \sigma 2)$, which has a zero mean and variance $\sigma 2$.

The detection of the Ack/Nack field may be modeled as the detection of the received signals through a radio channel. The testing hypothesis of the received signal detection through AWGN (a white Gaussian noise) channel $N(0,\sigma^2)$, which has a zero mean and variance $\sigma^2$, is shown in FIG. 2.

The probability of erasure in the decoding of the feedback information is determined by the thresholds for detecting Ack and Nack. In FIG. 2, A and −B are the mean soft output of the accumulated Negative acknowledgement and Acknowledgement symbols, respectively. Also in FIG. 2, x and −y are the thresholds for detecting Ack/Nack or determining erasure. The decoding has three hypotheses in the testing hypothesis as follows, $H_0$: Positive acknowledgement (bit "1" with signal power amplitude "−B") is sent $H_1$: Negative acknowledgement (bit "0" with signal power amplitude "A") is sent $H_2$: No acknowledgement is sent.

The transition probabilities of error receptions ($P_{e1}$, $P_{e2}$, and $P_{e3}$) and erasure receptions $P_{erasure1}$, $P_{erasure2}$, and $P_{erasure3}$ in AWGN are as follows, $$P_{e1} = P(r \geq x \mid H_0) = \int_x^\infty \frac{1}{\sqrt{2\pi}\,\sigma} e^{-\frac{(t+B)^2}{2\sigma^2}} dt = Q\left(\frac{x+B}{\sigma}\right) \quad (8)$$

$$P_{e2} = P(r \leq y \mid H_1) = \int_{-\infty}^{-y} \frac{1}{\sqrt{2\pi}\,\sigma} e^{-\frac{(t-A)^2}{2\sigma^2}} dt = 1 - Q\left(\frac{-y-A}{\sigma}\right) \quad (9)$$

$$P_{e1} = P(r \geq x \mid H_2) = \int_x^\infty \frac{1}{\sqrt{2\pi}\,\sigma} e^{\frac{t}{2\sigma^2}} dt = Q\left(\frac{x}{\sigma}\right) \quad (10)$$

$$P_{erasure1} = P(-y \leq r < x \mid H_0) = \int_{-y}^x \frac{1}{\sqrt{2\pi}\,\sigma} e^{-\frac{(t+B)^2}{2\sigma^2}} dt = Q\left(\frac{-y+B}{\sigma}\right) - Q\left(\frac{x+B}{\sigma}\right) \quad (11)$$

$$P_{erasure2} = P(-y \leq r < x \mid H_1) = \int_{-y}^x \frac{1}{\sqrt{2\pi}\,\sigma} e^{-\frac{(t-A)^2}{2\sigma^2}} dt = Q\left(\frac{-y-A}{\sigma}\right) - Q\left(\frac{x-A}{\sigma}\right) \quad (12)$$

$$P_{erasure3} = P(-y \leq r < x \mid H_2) = \int_{-y}^x \frac{1}{\sqrt{2\pi}\,\sigma} e^{\frac{t}{2\sigma^2}} dt = Q\left(\frac{-y}{\sigma}\right) - Q\left(\frac{x}{\sigma}\right) \quad (13)$$

The erasure decoding risk function R could be optimized by partial differentiation of the risk function R with respect to the two erasure thresholds x and y as shown in equation (14) below.

$$\frac{\partial R}{\partial x \partial y} = 0 \quad (14)$$

Equations (8), (9), (10), (11), (12), and (13) are then substituted into equations (3), (4), and (5) to get the probabilities of acknowledgement $P_{Ackj}$, negative acknowledgement $P_{Nackj}$, and erasure $P_{erasurej}$ of a j-th transmission through an AWGN channel. The risk function R for the signals through the AWGN channel may then be obtained by plugging the results of $P_{Nackj}$, $P_{Ackj}$, and $P_{erasurej}$ into equation (7). The risk function R of signal detection through the AWGN channel becomes a function of the two erasure thresholds x and y. Under the further assumption that the second threshold x equals the first threshold y, the risk function may be expressed as shown in equation (15) below.

$$R = C_f P_{fe,K} N_{Total}\left(1 - Q\left(\frac{-y-A}{\sigma}\right)\right) - \frac{C_c N_{Total}}{K} \left\{ \begin{array}{l} \left[\left(1 - Q\left(\frac{-y+B}{\sigma}\right)\right) + P_{m,K}\left(Q\left(\frac{-y+B}{\sigma}\right) - Q\left(\frac{-y}{\sigma}\right)\right) + \right. \\ \left. P_{fe,K}\left(Q\left(\frac{-y+B}{\sigma}\right) - Q\left(\frac{-y-A}{\sigma}\right)\right)\right] \times \\ \prod_{j=1}^{K-1}\left[Q\left(\frac{-y+B}{\sigma}\right) + P_{fe,j}\left(Q\left(\frac{-y-A}{\sigma}\right) - Q\left(\frac{-y+B}{\sigma}\right)\right) + \right. \\ \left. P_{m,j}\left(Q\left(\frac{-y}{\sigma}\right) - Q\left(\frac{-y+B}{\sigma}\right)\right)\right] \end{array} \right\} \quad (15)$$

From equation (15) it can be seen that the risk function R is a function of the erasure threshold y only. Thus, the optimization of the risk function R may obtained by differentiating the risk function with respect to the threshold y alone. The results of this optimization are shown in the following, $$\frac{dR}{dy} = \frac{N_{Total,i}}{\sqrt{2\pi}\,\sigma}\left[-C_f P_{fe,K} e^{-\frac{(-y-A)^2}{2\sigma^2}} + \frac{C_c}{K} Z_1(Z_2 + Z_3 Z_4)\right] = 0 \quad (16)$$

where $$Z_1 = \prod_{j=1}^{K-1}\left\{(1 - P_{fe,j} - P_{m,j})Q\left(\frac{-y+B}{\sigma}\right) + P_{fe,j}Q\left(\frac{-y-A}{\sigma}\right) + P_{m,j}Q\left(\frac{-y}{\sigma}\right)\right\}$$

$$Z_2 = (1 - P_{m,K} - P_{fe,K}) e^{-\frac{(-y+B)^2}{2\sigma^2}} + P_{fe,K} e^{-\frac{(-y-A)^2}{2\sigma^2}} + P_{m,K} e^{-\frac{(-y)^2}{2\sigma^2}}$$

$$Z_3 = \left[(1 - P_{m,K} - P_{fe,K})Q\left(\frac{-y+B}{\sigma}\right) + P_{fe,K} Q\left(\frac{-y-A}{\sigma}\right) + P_{m,k} Q\left(\frac{-y}{\sigma}\right) - 1\right]$$

$$Z_4 = \sum_{n=1}^{K-1} \frac{\left((1 - P_{m,n} - P_{fe,n}) e^{-\frac{(-y+B)^2}{2\sigma^2}} + P_{fe,n} e^{-\frac{(-y-A)^2}{2\sigma^2}} + P_{m,n} e^{-\frac{(-y)^2}{2\sigma^2}}\right)}{\left((1 - P_{m,n} - P_{fe,n})Q\left(\frac{-y+B}{\sigma}\right) + P_{fe,n} Q\left(\frac{-y-A}{\sigma}\right) + P_{m,n} Q\left(\frac{-y}{\sigma}\right)\right)}$$

There is no close form solution for y in equation (16). Accordingly, a numerical method is carried out for determining y. Namely, the results of equation (16) for a range of possible y values at a desired resolution are generated, and the y value that produces the result closest to zero is selected as the y value. The x threshold value is then set equal to the selected y value.

As will be appreciated, the optimized value of y is also a function of the variables K, $P_{mj}$, and $P_{fe}$. The number of transmissions K in a HARQ depends on the power setting of the DL scheduled transmission and the radio channel condition at the time. The probabilities of the frame error rate $P_{fe}$ for DL high speed data and missed detection of DL indication channel $P_{mj}$ for the j-th transmission are considered constant in the static channel modelling. Accordingly, the system designer may utilize the method of the present invention as a tool for adapting the erasure thresholds for a given system, or even a particular service area of a system.

Numerical Results

The following is a demonstration, through numerical analysis, of the optimized threshold for the 3-state Ack/Nack erasure decoding. The static parameters in the number analysis are as follows, $P_m=0.01$ $P_{f,1}=0.05$ and $P_{f,2}=0.005$ Absolute Acknowledgement power=Absolute Negative acknowledgement power (B=A).

Average Transmission per H-ARQ (K)=2

Figure 3:
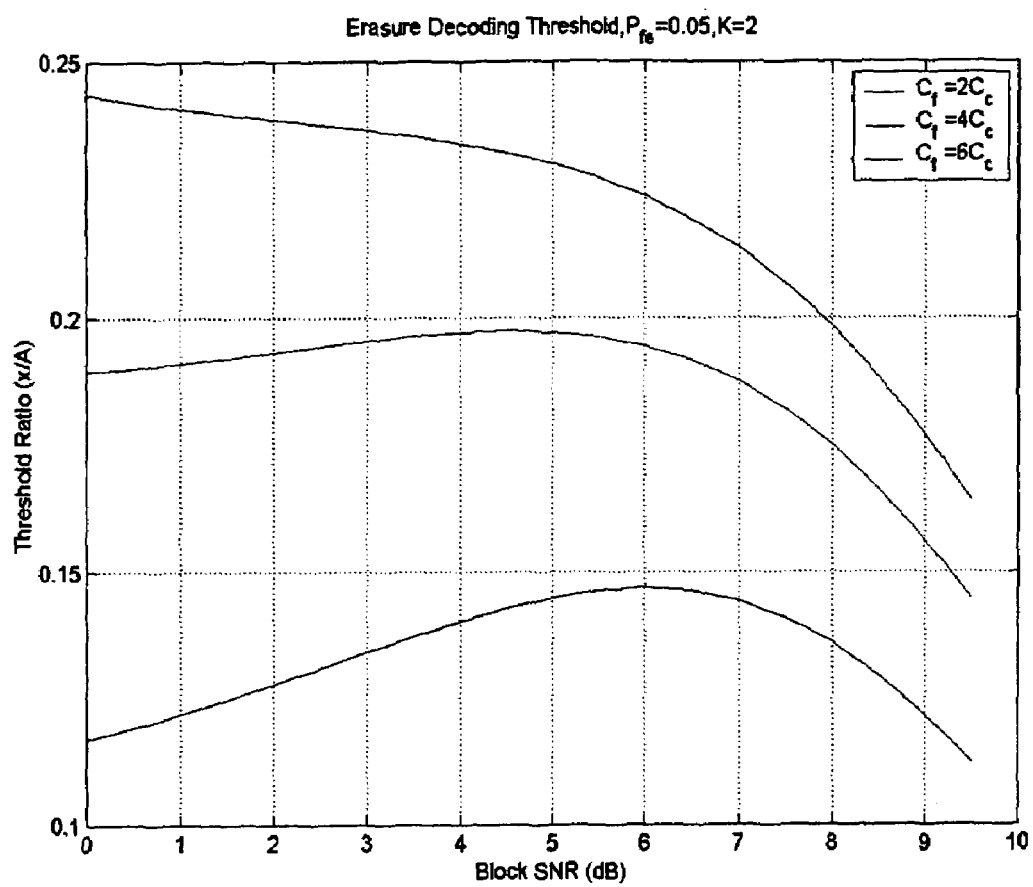
FIG. 3 illustrates the results the optimized threshold for the 3-state Ack/Nack erasure decoding using numerical analysis according to the present invention.

The results of the numerical analysis are shown in FIG. 3 for three curves with $C_f=2\ C_c$, $C_f=4\ C_c$, and $C_f=6\ C_c$. The results in FIG. 3 show that higher block SNR (signal-to-noise ratio) has lower erasure thresholds when the cost of missed detection $C_f$ is relatively higher than the cost of the correct throughput $C_c$.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

I claim:

1. A method of erasure decoding of acknowledgement (ACK)/negative acknowledgement (NACK) feedback information, comprising:
    detecting a state of received ACK/NACK feedback information for associated sent data based on at least one threshold derived using an objective function, the objective function including at least a first term representing an effect on data throughput for at least one possible type of error in detecting a state of the received ACK/NACK feedback information, wherein
    the possible type of error is missed detection of a NACK, and
    the first term represents a cost of an average number of total bits to be retransmitted if a NACK is missed in detection.

2. The method of claim 1, wherein the first term includes a weight variable representing a cost of a false detection of a NACK.

3. The method of claim 1, wherein the first term is defined as, $$C_f N_f P_{missed=detection}$$

where $C_f$ is the throughput cost of falsely detecting a Nack as an Ack, $N_f$ is the number of bits of the missed detected packet, and $P_{missed=detection}$ is the probability of the missed detection.

4. The method of claim 1, wherein the objective function includes a second term representing an effect on data throughput if the state of the received ACK/NACK feedback information is correctly detected.

5. The method of claim 4, wherein the second term includes a weight variable representing a cost of correct detection of the state of the received ACK/NACK feedback information.

6. The method of claim 4, wherein the second term includes a throughput variable representing average data throughput.

7. The method of claim 6, wherein a value of the throughput variable is based on a probability that the ACK/NACK information is detected to represent an ACK.

8. The method of claim 6, wherein a value of the throughput variable is based on a probability that the ACK/NACK information is detected to represent a NACK.

9. The method of claim 6, wherein a value of the throughput variable is based on a probability that the ACK/NACK information is detected to represent an erasure.

10. The method of claim 4, wherein the second term is defined as, $$-C_c D$$

where $(-C_c)$ is the throughput cost of correctly detecting an Ack, and D is an average data throughput.

11. The method of claim 1, wherein the threshold is further derived based on an effect on data throughput if the state of the received ACK/NACK feedback information is correctly detected.

12. The method of claim 11, wherein the effect on data throughput if the state of the received ACK/NACK feedback information is correctly detected is expressed as a negative cost of the data throughput if the state of the received ACK/NACK feedback information is correctly detected.

13. A method of erasure decoding of acknowledgement (ACK)/negative acknowledgement (NACK) feedback information, comprising:
    detecting a state of received ACK/NACK feedback information for associated sent data using at least one threshold derived using an objective function including a first term and a second term, each representing an effect on data throughput for at least one possible type of error in detecting a state of the received ACK/NACK feedback information, wherein
    the possible type of error is missed detection of a NACK, and
    the effect on data throughput is expressed in terms of a cost of an average number of total bits to be retransmitted if a NACK is missed in detection.

14. A method of erasure decoding of acknowledgement (ACK)/negative acknowledgement (NACK) feedback information, comprising:
    optimizing erasure thresholds for erasure decoding ACK/NACK feedback information based on HARQ throughput performance using an objective function including at least one term relating to throughput cost of retransmissions from at least one higher layer protocol caused by missed detection of a NACK, wherein the throughput cost of retransmissions is expressed in terms of a cost of an average number of total bits to be retransmitted if a NACK is missed in detection.

15. A method of wireless communication comprising: employing an objective function in determining at least one of an ACK, NACK and erasure, the objective function including at least one term accounting for at least an effect on data throughput in response to at least one error type, wherein the error type is missed detection of a NACK, and the effect on data throughput is expressed in terms of a cost of an average number of total bits to be retransmitted if a NACK is missed in detection.

16. The method of claim 15, wherein the objective function further accounts for an effect on data throughput if the state of the received ACK/NACK feedback information is correctly detected.

* * * * *